United States Patent [19]
Strickman

[11] 3,718,612
[45] Feb. 27, 1973

[54] PROCESS FOR PRODUCING A CIGARETTE FILTER MATERIAL

[75] Inventor: Robert L. Strickman, River Vale, N.J.

[73] Assignee: The Robert L. Strickman Foundation, Inc., New York, N.Y.

[22] Filed: June 16, 1970

[21] Appl. No.: 57,842

Related U.S. Application Data

[60] Division of Ser. No. 721,563, April 11, 1968, Pat. No. 3,618,618, which is a continuation-in-part of Ser. No. 559,495, Dec. 6, 1966, abandoned, which is a continuation-in-part of Ser. No. 424,626, Jan. 11, 1965, abandoned, which is a continuation-in-part of Ser. No. 59,035, Sept. 28, 1960, abandoned.

[52] U.S. Cl. ............260/2.5 BD, 131/10.7, 131/265, 131/269, 260/2.5 A, 260/2.5 AB, 260/2.5 AD, 260/2.5 AK, 260/2.5 BD
[51] Int. Cl. ............................................C08g 22/44
[58] Field of Search ........260/2.5 A, 2.5 BD, 2.5 AK, 260/2.5 AD, 2.5 AB; 131/10.7, 265, 269; 252/428, 430

[56] References Cited

UNITED STATES PATENTS

| | | | |
|---|---|---|---|
| 3,120,849 | 2/1964 | Guttag | 260/2.5 AR |
| 3,127,373 | 3/1964 | Guttag | 260/2.5 AR |
| 2,770,241 | 11/1956 | Winkler | 131/265 |
| 3,538,020 | 11/1970 | Heskett | 260/2.5 AK |
| 3,574,150 | 4/1971 | Jefferson | 260/2.5 BD |
| 3,171,820 | 3/1965 | Volz | 260/2.5 BD |
| 2,181,614 | 11/1939 | Striefling | 131/265 |
| 3,006,346 | 10/1961 | Golding | 131/265 |
| 2,916,464 | 12/1959 | Ebneth | 260/2.5 AB |

FOREIGN PATENTS OR APPLICATIONS

| | | | |
|---|---|---|---|
| 922,306 | 3/1963 | Great Britain | 260/2.5 AK |
| 620,248 | 5/1961 | Canada | 260/2.5 BD |
| 1,173,449 | 12/1969 | Great Britain | 131/265 |

*Primary Examiner*—Donald E. Czaja
*Assistant Examiner*—C. Warren Ivy
*Attorney*—Louis F. Reed

[57] ABSTRACT

Filter materials for filtering aerosols, such as cigarette filters for filtering tobacco smoke, are provided comprising rigid polyurethane particles devoid of any cellular structure. Preferably the particles are granular and of jagged, spiny, cragged nature. The rigid polyurethane is produced from a polyol and a polyisocyanate.

The particles are produced by first preparing a rigid polyurethane foam, preferably with the aid of a blowing agent, granulating the foam, treating the granules with hot water or steam to hydrolyze unreacted isocyanate and other free materials to render them inert, and then dried.

Preferably, inorganic additives may be present during the preparation of the rigid polyurethane foam, such as the lower alkyl silicates, e.g., ethyl silicate, and water soluble salts of the acids of metals of groups VA and VIA of the Periodic Table, e.g., sodium tungstate.

Inorganic additives may be added to the filter particles, such as an alkaline earth metal carbonate, silicate or hydroxide.

12 Claims, 3 Drawing Figures

PATENTED FEB 27 1973

A PROCESS FOR PRODUCING A CIGARETTE FILTER MATERIAL

This application is a division of my copending application Ser. No. 721,563, filed Apr. 11, 1968 now U.S. Pat. No. 3,618,618, which is in turn a continuation-in-part of my copending application, Ser. No. 599,495, filed Dec. 6, 1966 now abandoned, which is in turn a continuation-in-part of my then pending application, Ser. No. 424,626, filed Jan. 11, 1965, now abandoned, which was a continuation-in-part of my then pending application, Ser. No. 59,035, filed Sept. 28, 1960, now abandoned.

This invention relates to filters for treating aerosols in general and the like, and especially tobacco smoke, as from cigarettes, etc. In particular, it is directed to novel filter structures, novel methods of effecting filtration of the smoke; novel filtering materials or combinations thereof, and novel cigarettes embodying said novel filter structures; and said filtering materials.

The problem of filtering aerosols, such as tobacco smoke, especially the smoke from cigarettes, has arrested the attention of many investigators. Such smoke is a highly complex product. It contains nicotine, tars, irritating substances and many other components. Although many proposals have been advanced and teachings disclosed as to how the smoke can be treated in the restricted working space (the cubage) at the end of a cigarette, no one has heretofore developed a filter which provides for controlled elimination of the undesirable constituents present in the smoke stream without imparing the "taste quality" of the smoke.

I have discovered that it is possible to provide filters with means for effectuating the removal of the unwanted components of the smoke stream without imparing the taste quality or the sensation thereof. In fact, with the filter of the present invention I am able to provide for improvement in the taste quality of the smoke.

Accordingly, it is among the principal objects of this invention to provide filters or filtration systems suitable for use in treating aerosols, and particularly within the restricted cubage available in a cigarette, which will:

1. Remove substantial amounts of the tarry components;
2. Remove substantial amounts of the alkaloids, including the nicotine;

In addition to this, the filtration reduces the moisture content and the temperature of the smoke stream, and removes irritating substances from the gaseous phase of the smoke. These effects are obtained while supplying the satisfying quality (taste, aroma) sought by the smoker.

In its fundamental aspects, the objects of this invention as above mentioned, as well as other objects, are achieved by a combination of treatments of aerosols, such as smoke, so that the reduction in irritant action, moisture content, and temperature and the removal (by chemical and physical fixation) of the unwanted, undesirable components are achieved during the flow of the smoke stream through the filter of the invention.

More particularly, the objects of this invention are achieved in consequence of the following: the tarry and particulate components are caused to be removed from the smoke stream by providing a highly suitable surface on which these components may impinge; and may also include means for effectuating adsorption and/or absorption and removal of some of the irritating undesirable gaseous components of a smoke. The filter may contain surface activating substances which aid in removing unwanted substances from the smoke. The alkaloids, e.g., nicotine, etc. and other components of the smoke may be removed by suitable chemical action through the presence of substances which enter into chemical combination therewith, thus producing compounds that are retained by the filter structure.

It is known that the irritating action or otherwise undesirable effect of tobacco smoke is due at least in part to the presence in the gas phase of such compounds as aldehydes, sulfides and hydrogen cyanide. The filter of the invention will remove substantial amounts of these materials. In addition, phenols and acidic materials which are known to be present in tobacco smoke and are believed to be harmful are reduced in substantial amounts.

The filter of the invention therefore provides: means for extensive physical and chemical processing of the smoke stream, including control of the pH by removal of acidic components; fixation or binding of the alkaloids; and means for reducing the temperature of the smoke stream during the flow through the filter to provide for temperature reduction to within a suitably desired range.

A fuller understanding of the foregoing objects and of the invention will become apparent to those skilled in the art from the following detailed description, taken in connection with the accompanying drawings wherein.

Figure 3:

FIG. 3 is a photomicrograph (magnified 75 times) of granular filter material in accordance with a preferred embodiment of the present invention, showing the jagged, spiny, cragged structure of the particles. This photomicrograph was taken after the filter material had been used as a filter in smoking a cigarette and the smoke passed through the filter. A number of the particles which had successfully removed tarry materials from the cigarette smoke are shown to have darkened as compared to the lighter nature of the other particles.

The filter material of the present invention comprises a particulate rigid polyurethane which is essentially devoid of cellular structure and, in a preferred embodiment, is composed of granules which are of a jagged, spiny, cragged nature. The filter material is essentially devoid of any components, such as residual unreacted isocyanates, which impart any undesirable taste of their own to the smoke passing through the filter. Rigid polyurethanes, as contemplated by the invention, are characterized by their essential lack of elasticity and their ability to be readily converted into small particles using conventional granulating equipment. This is contrasted with soft polyurethanes which behave like elastomeric materials and which cannot be particulated under these circumstances.

The particulate filter material of the invention is desirably of a particle size which is preponderantly below about 750 microns, and preferably preponderantly between about 150 and 600 microns. It has been found that a particle size between about 175 and 450 microns give best results, but variations may be desirable depending upon consumer preferences.

The rigid polyurethanes which comprise the filter material of the invention are those conventionally known to be the reaction products of polyisocyanates with polyols. The polyols employed as starting materials preferably predominantly have functionality of at least three. The rigidity of the polyurethanes, as well recognized by the polymer chemist, depends upon the existence of crosslinks between the molecules and cross-linking is obtained by employing starting materials having a reaction functionally greater than two. Most commonly, this higher functionality is found in the polyol component, but more recently polyisocyanates have become commercially available having a functionality greater than two.

Any polyol which, when reacted with a polyisocyanate, produces a rigid polyurethane, may be employed, although for cigarette filter use it should not impart any noticeable odor or taste to the smoke. Among the preferred polyols are the polyether polyols, and especially the reaction products of alkylene oxides, preferably propylene oxides, with low-molecular-weight compounds having three or more hydroxyl groups, such as glycerol, 1,2,6-hexanetriol, trimethylolpropane, pentaerythritol, methylglycoside, sorbitol, sucrose, etc. Glycols, such as polypropylene glycol, etc., may be employed especially if used together with a higher functional polyol or a polyisocyanate having a functionality of greater than two, i.e., having more than two isocyanate groups per molecule.

Instead of polyether polyols, there may be employed polyhydroxyl-terminated polyesters, preferably those derived at least in part from triols or higher. The polyester polyols are usually less advantageous than the polyether polyols because they are generally more expensive and more viscous.

Polyols are usually referred to in terms of their hydroxyl number. Polyols having a high hydroxy number (above 300) are preferred, particularly if polyols other than simple, non-polymeric polyols are employed. Hydroxyl numbers which are between about 300 and 800 are most desirable. At the higher hydroxyl numbers, a more friable, but also a more dimensionally stable expanded polyurethane results.

Among the additional polyols which may be employed with a polyisocyanate to produce the rigid polyurethanes are: polyethylene glycol having molecular weights not exceeding 400, diethylene glycol, triethylene glycol, dipropylene glycol, tripropylene glycol, 1,4-butanediol, hexanediol, neopentyl glycol, trimethylolethane, trimethylolphenol, glucose, degraded starches and celluloses, hydroxymethyl derivatives of cyclohexanol, castor oil, hydroxyl terminated polymers such as those derived from lactones, such as caprolactone. These may be employed alone, or preferably as the reaction products with an alkylene oxide, such as propylene oxide, or with a polybasic acid or its anhydride. Among the polybasic acids which may be used are phthalic acid, adipic acid, sebacic acid, dimerized linoleic acid, oxalic acid and chlorendic acid.

Any polyisocyanate may be employed which will give a rigid polymer with a suitable polyol, but preferably any polyisocyanate which is a liquid at the temperature of reaction, i.e., at between about 15° C. and 90° C. and particularly between about 15° C. and 50° C. shall be employed. Particularly useful is the widely used tolylene diisocyanate (TDI) sold commercially as the 80:20 mixture of 2,4:2,6 isomers, its crude grade, also p,p'-diphenyl methane diisocyanate (MDI) and its crude grade (PPI) and polymethylene polyphenyl isocyanate (a mixture sold under the tradename PAPI). Other polyisocyanates which can be employed are: dianisidine diisocyanate, xylylene diisocyanate, diphenyl sulfone diisocyanate, 4-chloro-1,3-phenylene-diisocyanate; 4-isopropyl-1,3-phenylene diisocyanate; 2,4-diisocyanatodiphenylether; 3,3-dimethyl-4,4-diisocyanatodiphenylmethane; mesithylene diisocyanate; 4,4'-diisocyanatodibenzyl; 1,5-naphthalene diisocyanate; 3,3'-bitolylene-4,4'-diisocyanate; triphenylmethane triisocyanate, tritolylmethane triisocyanate, tetramethylene diisocyanate; hexamethylene diisocyanate; the diisocyanate derived from dimer acids; decamethylene diisocyanate, the reaction product of toluene diisocyanate with trimethylolpropane at an NCO/OH ratio of 2:1 (Mondur CB), etc.

The polyisocyanate is advantageously employed in slight stoichiometric excess over the polyol so as to provide excess isocyanate linkages for cross-linking with formation of biuret and allophanate linkages. However, typical isocyanate to organic hydroxyl group ratios are from 0.75 to 1.25. On a weight basis this represents a range of approximately 40 to 150 parts of polyisocyanate per 100 parts of polyol. Excess isocyanate will also react with any water, if present, to generate carbon dioxide which is a blowing agent to aid in forming a foam. Higher ratios up to 2 or higher may be employed if water is present in the foaming reaction. The use of excess isocyanate as well as the use of polyisocyanate having functionalities greater than two tend to provide foams which are more friable.

The use of catalysts to assist in the formation of the polyurethane is conventional and may be employed in the present invention. Catalysts which are water soluble and which, therefore, may be removed from the reaction product by water washing are preferred. Since the products are intended for use in cigarette filters, it is also desirable that the catalyst be substantially odorless and imparts no taste to the smoke. Especially effective as a catalyst is N,N,N',N'-tetrakis(2-hydroxypropyl)ethylenediamine (sold under the tradename Quadrol), since it is both catalytic, because of its amino groups, and reactive with the polyisocyanate, because of its hydroxyl groups. It acts, therefore, as a polyol, a catalyst and a crosslinking agent and since it becomes chemically incorporated into the polyurethane, it imparts no odor to the final product or taste to the smoke. Such amines as bis-(2-hydroxypropyl)-2-methylpiperazine and diethanol amine behave similarly.

Catalyst may be omitted, especially of the formulations of Examples 3 and 4, below, are employed. If a conventional catalyst is employed, amounts of between 0.02 and 2.0 parts per 100 parts by weight of polyol are desirable, but if Quadrol or other catalyst which becomes chemically incorporated into the polymer is employed, much larger amounts, such as up to 20 parts, are usually desirable.

Instead of the catalyst disclosed above, any of the conventional basic catalysts employed in polyurethane foam technology can be used. These include N-methyl morpholine, N-ethyl morpholine, trimethylamine, triethylamine, tributylamine and other trialkylamines, tetramethylbutane diamine, trimethylpiperazine, tetramethylguanidine, diethylaminoethanol, 3-diethylaminopropionamide, heat activated catalysts, such as triethylamine citrate, 3-morpholinopropionamide, 2-diethylaminoacetamide, the esterification product of 1 mole of adipic acid and 2 moles of diethylethanolamine, triethylenediamine, N,N'-diethylpiperazine, N,N-dimethylhexahyroaniline and tribenzylamine. Tin catalysts may also be used alone or in conjunction with amine catalysts. They include stannous octoate, dibutyltin acetate, dibutyltin dilaurate, dibutyltin dioctoate, etc.

The polyurethane is produced first in an intermediate form as a rigid foam. This foam may be produced in accordance with the practices well known in the foam art as the prepolymer method, the semi-prepolymer (or quasi-prepolymer) method, or the so-called one-shot method. These are all well-known methods of foam preparation. The semi-prepolymer method is generally considered to be more reliable, but the one-shot method is clearly the more economical. Both of these latter two methods are especially suitable for manufacture of the foam from which filter material of the present invention may be produced.

The preparation of foam requires the preparation of polyurethane in the presence of some means of blowing or expanding the polymer material. In accordance with one well-known foam-producing technique water may be employed which will react with excess isocyanate to produce carbon dioxide from the reaction, which then acts as the blowing or expanding agent. One may employ nitrogen or carbon dioxide gases to provide the expansion. Also, whipping of air into the polymerizing mass may be used. In accordance with one preferred method of the invention, it is desirable to employ a halogenated hydrocarbon, such as the fluorinated hydrocarbons of the type sold under the trademarks "Freon" and "Genetron." Among the fluorinated hydrocarbons which may be employed are those which are sufficiently volatile to evaporate at the temperature of foam production. Desirably, the material shall have a boiling point slightly higher than ambient temperature. Among the satisfactory fluorinated hydrocarbons which may be employed are trichlorofluoromethane, dichlorodifluoromethane, dichlorotetrafluoroethane, dichloromonofluoromethane, monochlorodifluoromethane, trichlorotrifluoroethane, and monochlorotrifluoromethane. Desirably, about 5 to 35 parts of blowing agent are employed per 100 parts of polyol.

Conventional surface active agents may be employed, especially those known to polyurethane technologists, to help in nucleation and the formation of a more or less uniform, fine cell structure. These include the silicones and particularly those known in the trade as L-520, L-530, L-5310, and L-5320 (Union Carbide) and DC-199, DC-113, DC-201 and DC-202 (Dow Corning), XF-1066 (General Electric) believed to be block copolymers of silicone and alkylene oxides. These are usually employed in amounts of up to 1 part per 100 of polyol.

The rigid polyurethane foam is cured after formation by being permitted to stand at ambient temperature for at least about a day. Alternatively, the curing may be accelerated by the use of elevated temperatures, which generally should not exceed 130° C. During the curing treatment the foam loses its tackiness and develops its maximum rigidity.

After the rigid polyurethane foam is produced, the foam is subjected to a granulation operation to produce granular particles having highly irregular physical shapes in the form of jagged, spiny, cragged particles which characterize the invention. One preferred method of granulation is the use of a mill wherein impact and friction of particles impinging against one another causes a particulating action. One such mill is the Pallmann Model REF mill.

After the grinding operation, the rigid polyurethane particles are subjected to the action of hot water or steam. This is an important part of the process. This is more than a simple washing operation since, in addition to removing soluble components, it also provides a chemical reaction to convert residual isocyanate, which is irritating to the mucous membranes, and any ethyl silicate which may be present from a treatment which will be described hereinbelow, into odorless products of negligible vapor pressure. This is a hydrolysis reaction and one which is particularly important for filter material of the invention to be employed in the filtration of cigarette smoke. The hydrolysis is typically conducted at temperatures of about 50° to 100° C., and preferably between about 80° and 100° C. Higher temperatures such as achieved by autoclaves or the use of steam may be employed, provided they do not degrade the jagged, spiny character which defines the preferred embodiments of the invention. It is important to allow sufficient time to complete the step as I have found that an inadequately hydrolyzed product not only has a most disagreeable, irritating odor, but also lacks the high smoke filtering capacity of my properly hydrolyzed filter materials.

It is desirable, although not essential, to employ certain materials in the preparation of the rigid polyurethane foam which is an intermediate material in the preparation of the filter material of the invention. Thus, for example, it is desirable to employ water-soluble "ate" or acid salts of metals of groups VA and VIA of the Periodic Table of Elements, such as the alkali tungstates, molybdates, vanadates and chromates. (In some forms of the periodic table the metals tungsten, molybdenum, vanadium and chromium are referred to as being in groups VB and VIB). The preferred salt for this purpose is sodium tungstate. These metal salts are employed in the form of their aqueous solutions, preferably having a strength of about 10 to 30 percent by weight and an amount ranging from 0.2 to 4 parts per 100 parts by weight of polyol, and, preferably, from about 0.5 to 2 parts per 100 parts of polyol, with the water-soluble metal salt being used in aqueous solution having a strength of 20 to 30 percent.

These water-soluble salts may be omitted, but with a concomitant sacrifice in the speed of reaction in producing the polyurethane. These water-soluble metal salts have been found to be extremely helpful in producing low density foams. This is desirable since it is preferable to employ as the rigid polyurethane foam intermediate a foam having a density less than about 3 pounds per cubic foot and preferably of about 1.3 to 2.5 pounds per cubic foot. It is also believed that the use of these water-soluble metal salts provides optimum effects in producing particles of rigid polyurethane having extremely high adsorptivities.

Another optional inorganic material which may be employed in the preparation of the rigid polyurethane intermediate foam is the lower alkyl silicates, such as those alkyl silicates containing up to four carbon atoms in the alkyl group. Ethyl silicate is preferred. It is desirable to employ up to about 5 parts of alkyl silicate per 100 parts of polyol. Where ethyl silicate is employed, it is particularly important to subject the reaction product before use to the hydrolysis treatment employing hot water or steam so as to hydrolyze any free ethyl silicate and thereby remove any toxicity or odor problems.

In accordance with a preferred embodiment of the invention it is desirable to incorporate certain other inorganic additives into the particulate polyurethane filter material. Those inorganic additives, such as aluminum hydroxide and magnesium trisilicate, as well as other carbonates, silicates or hydroxides of alkaline earth metals may be employed. Thus one may employ magnesium hydroxide, magnesium oxide, magnesium carbonate, calcium carbonate, a gel of magnesium carbonate and aluminum hydroxide dried together, and magnesium aluminum silicate. Among these the mixture of aluminum hydroxide and magnesium trisilicate has been found to give the most acceptable taste to smokers. When aluminum hydroxide and magnesium trisilicate are employed, they are preferably added as a 1:1 mixture by weight in amounts of between about 3 and 15 percent by weight of the filter material. However, ratios of the two components may be varied materially and the total amount may vary from 0 to 25 parts by weight per 100 parts of polyurethane particles. These inorganic additives are believed to be particularly desirable to remove certain constituents from the gaseous phase of tobacco smoke and to make tobacco smoke milder by removing irritating compounds from the gas. Surprisingly, the filter material of the invention having these inorganic additives present provides a highly selective removal of nicotine from the smoke.

The particle size of the inorganic additives may be the same as for the polyurethane particles or lower, for example, less than 750 microns.

Other additives which may be employed with the filter material of the invention are cellulose acetate fibers, charcoal granules, powdered cellulose, etc. These materials should not exceed 25 percent by weight of the polyurethane filter material.

The following are examples in accordance with this invention. The parts are by weight, unless otherwise specified.

EXAMPLE 1

Step A

A polyurethane foam was first manufactured from the following materials:
100 parts of polyol (formed by the condensation of sorbitol with propylene oxide, the condensation product having a hydroxyl number of about 490 (available as G 2410 from Atlas Powder Co., Chemicals Division, Wilmington 99, Delaware);
76 parts of tolylene diisocyanate (a commercially available 80/20 mixture of the 2,4 and 2,6 isomers);
25 parts of trichlorofluoromethane; and
0.5 to 1.5 parts of triethylenediamine, as catalyst.

The catalyst is dissolved in the halogenated hydrocarbon, which is added to the polyol, followed by isocyanate and the mixture is suitable agitated. Foaming begins.

Upon completion of the foaming reaction, and when the mass becomes rigid, it is granulated. The granular mass, having a mesh size in the range of 50-300 (U.S. standard mesh size), constitutes material for preparation of a filter unit.

Step B

The granular mass produced in Step A is washed with hot water for about 3-5 minutes and filtered. This removes any free isocyanate. The still moist granules are dried at atmospheric pressure at a temperature of 60°-105 C., or if desired, under sub-atmospheric pressure, at a lower temperature. The dried granules constituting the product of this Example are filled into the open tubular end of a cigarette and thus constitute a filter unit. The granules are prevented from falling out by a small plug of cotton or other suitable material.

Figure 1:
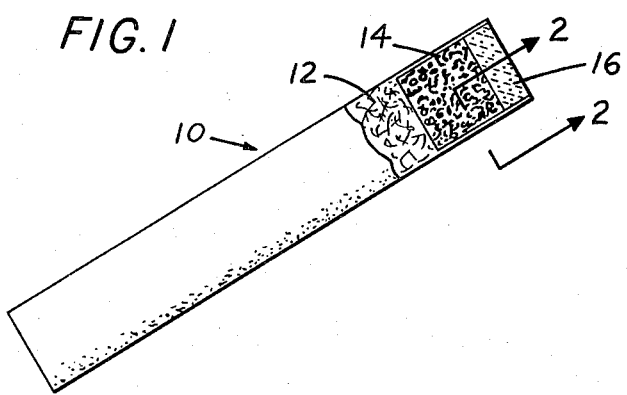
FIG. 1 is an illustration of a cigarette, partly in section, showing the utilization of a filtration unit in accordance with one of the embodiments of this invention.
Figure 2:
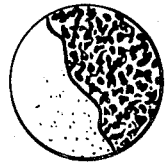
FIG. 2 is a cross section, taken on the line 2—2, of FIG. 1.

Such a structure is illustrated in FIG. 1 wherein 10 designates a cigarette, 12 the tobacco, 14 the granules and 16 the plug.

EXAMPLE 2

80 to 97 parts of the dried isocyanate-free granules of Example 1, and 3 to 20 parts of a 1:1 mixture of:
a. aluminum hydroxide and
b. magnesium trisilicate
are intimately mixed. This mixture, when filled into the open tubular end of a cigarette, constitutes a filter. The general structure thereof is akin to FIG. 1.

EXAMPLE 3

To 100 parts of the polyol described in Example 1, there are added a blend of:
10 parts of a 20 percent sodium tungstate aqueous solution, and
10 parts of ethyl silicate (condensed, 40 percent $SiO_2$ content).

To the mixture formed by the addition of the blend with the polyol, there are added:
76 parts of tolylene diisocyanate (described in Example 1) and
25 parts of trichlorofluoromethane.

The mixture is allowed to react. Upon completion of the reaction and when it becomes rigid, it is granulated, washed and dried as described in Example 1. Alternatively, the isocyanate may be reacted at about 80° C. with a portion (about ¼) of the polyol to form a quasi-prepolymer. The latter is then reacted with the remainder of the polyol in the presence of the blowing agent and catalyst. The foam thus produced has a fine uniform cell structure. The product consists of spiny, jagged, craggy irregularly shaped particles with a large surface area.

The granules produced in this Example, when filled into the open tubular end of a cigarette, constitute a filter unit. The general structure thereof is akin to FIG. 1.

EXAMPLE 4

To 97 parts of the granules of Example 3, there are added three parts of a 1:1 mixture of:
a. aluminum hydroxide, and
b. magnesium trisilicate.

The intimate mixture thus produced, when filled into the open tubular end of a cigarette, constitutes a filter unit. The general structure thereof is akin to FIG. 1. Smoking tests showed a pleasant mild sensation, devoid of harshness or irritation.

EXAMPLE 5

STEP A Step 30 parts of a reaction product of pentaerythritol with propylene oxide and having a hydroxyl number of 560 is mixed with 100 parts of tolylene diisocyanate (80/20 mixture of the 2,4 and 2,6 isomers). The temperature is not allowed to exceed 90° C. and the reaction is carried out under dry nitrogen gas. The product is allowed to cool and is stored in the absence of moisture.

Step B

A mixture is made of 75 parts of the polyol described in Step A, 10 parts of N,N,N',N'-tetra-kis (Hydroxypropyl) ethylene diamine, 3 parts of a 30 percent aqueous solution of sodium tungstate, 2 parts of ethyl silicate, 0.3 part of a 30 percent aqueous solution of triethylene diamine, 15 parts of trifluorochloromethane, and 0.5 part of a urethane-grade silicone surface active agent (L-520 of Union Carbide).

Step C

Approximately equal weights of the products from Step A and Step B are thoroughly mixed and poured into a mold. The resulting foam is a white, fine-celled material which is allowed to cure for a day at room temperature. The resulting foam is granulated in a Pallmann mill, and the resulting particles treated with boiling water for about 15 minutes, followed by about a half hour at 80°–100° C. The treatment with water may be repeated, if desired, and is continued until the product is odor free. The white granules are then dried in an oven at 105° C. The fraction smaller than 420 microns particle size and larger than 177 microns particle size is collected. It consists of particles with a spiny, cragged, irregular shape devoid of cellular structure.

In lieu of sodium tungstate mentioned in the foregoing example, there may be used potassium tungstate, or any alkali metal molybdate, vanadate, chromate, etc.

EXAMPLE 6

Example 3 was repeated, employing instead of tolylene diisocyanate an equivalent weight of methylene diphenyl diisocyanate. The result was a filter material having equivalent properties to those of the produce of Example 3.

EXAMPLE 7

Example 4 was repeated, but omitting the ethyl silicate. The resulting material produced a satisfactory filter.

EXAMPLE 8

Example 4 was repeated, but employing an equal weight of sodium vanadate instead of sodium tungstate. The resulting filter product was similar in its properties to the product of Example 4.

EXAMPLE 9

Example 4 was repeated, but employing an equivalent amount of a mixture of polypropylene glycol (Niax 1025) and Quadrol instead of the sorbitol derived polyol. The resulting filter material was similar in its properties to the produce of Example 4.

EXAMPLE 10

Example 4 was repeated, but employing an equivalent amount of polymethylene polyphenyl polyisocyanate (PAPI) instead of tolylene diisocyanate. The filter product obtained was similar in its properties to the product of Example 4.

EXAMPLE 11

Example 4 was repeated, but employing an equal weight amount of sodium molybdate instead of sodium tungstate. The resulting filter material was similar in its properties to the product of Example 4.

EXAMPLE 12

Example 4 was repeated, but employing an equal weight amount of sodium chromate instead of sodium tungstate. The resulting filter material was similar in its properties to the product of Example 4.

EXAMPLE 13

To the product of Example 3 was added 2.5 percent by weight of each of magnesium hydroxide and aluminum hydroxide. The resulting product was found to remove more tars and nicotine from cigarette smoke than the filter material of Example 3.

EXAMPLE 14

To the product of Example 3 was added 2.5 percent by weight of each of calcium carbonate and magnesium carbonate. The resulting product was found to remove more tars and nicotine from cigarette smoke than the filter material of Example 3.

EXAMPLE 15

To the product of Example 3 was added 5 percent by weight of aluminum hydroxide and 2.5 percent by weight of magnesium trisilicate. The resulting product was found to remove more tars and nicotine from cigarette smoke than the filter material of Example 3.

EXAMPLE 16

To the product of Example 3 was added 12.5 percent by weight of each of aluminum hydroxide and magnesium trisilicate. The resulting product was found to remove more tars and nicotine from cigarette smoke than the filter material of Example 3.

EXAMPLE 17

To the product of Example 3 was added 5 percent by weight of magnesium aluminum silicate. The resulting product was found to remove more tars and nicotine from cigarette smoke than the filter material of Example 3.

EXAMPLE 18

To the product of Example 3 was added 5 percent by weight of codried gel of magnesium carbonate and aluminum hydroxide. The resulting product was found to remove more tars and nicotine from cigarette smoke than the filter material of Example 3.

EXAMPLE 19

To the product of Example 3 was added 10 percent by weight of magnesium oxide. The resulting product was found to be excellent for the removal of tars and nicotine from cigarette smoke.

COMPARISONS

Comparative tests were conducted by the method described by Wartman, Cogbill and Harlow in their paper entitled "Determination of Particulate Matter in Concentrated Aerosols-Application to Analysis of Cigarette Smoke," Analytical Chemistry, Volume 31, pages 1705–09, October, 1959.

Cigarette A

This cigarette was a Kent, king size, with its usual filter.

TPM = 17.5 mg; Nicotine = 0.83 mg.

Cigarette B

This cigarette was one whereof the filter unit consisted of 65 mg. of shredded foam prepared by the shredding method described in Example 7 of Winkler U. S. Pat. No. 2,770,241.

The foam was made from one hundred parts of a polyester resin, acid No. 35, made from 3 mols of adipic acid, 3-½ mols of 1,4-butylene glycol and ½ mol of glycerine, was copolymerized with 48 parts of a mixture of tolylene diisocyanate (the 2,4- and 2,6-isomers) in the presence of one part of a 10 percent aqueous solution of a non-ionic emulsifier, Aerosol OT, and ½ part of N-methyl-morpholine, as the activator. The mass was mixed and placed into a preheated mold.

This highly elastic foam was shredded and 65 mg. thereof were packed into a one inch long hull.

TPM = 16.8 mg; Nicotine = 0.79 mg.

Cigarette C

This cigarette was one whereof the filter unit consisted of 65 mg. of granules (14 of FIG. 1) prepared as described in Part A of Example 1.

TPM = 13.8 mg; Nicotine = 0.73 mg.

Cigarette D

This cigarette was one whereof the filter unit consisted of 65 mg. of the granules (14 of FIG. 1) prepared as described in Part B of Example 1.

TPM = 12.9 mg; Nicotine = 0.70 mg.

Cigarette E

This cigarette was one whereof the filter unit consisted of 65 mg. of granules (14 of FIG. 1) prepared as described in Example 2.

TPM = 10.2 mg; Nicotine = 0.60 mg.

Cigarette F

This cigarette was one whereof the filter unit consisted of 65 mg. of the granules (14 of FIG. 1) prepared as described in Example 3.

TPM = 9.8 mg; Nicotine = 0.56 mg.

Cigarette G

This cigarette was one whereof the filter unit consisted of 65 mg. of the granules (14 of FIG. 1) prepared as described in Example 4.

TPM = 7.3 mg; Nicotine = 0.51 mg.

In a series of panel tests, I have found that there was a marked and noticeable diminution in the irritating effect and cough reflexes of smoke filtered in accordance with units of this invention as contrasted with that of commercially available filter cigarettes.

In the preferred embodiment of this invention, I utilize as the fundamental component of the filter, granulated rigid polyurethanes as described above which are characterized by the absence of free, unreacted isocyanate and of other materials which impart undesirable taste to tobacco smoke. The filter materials of the invention exhibit high surface energies which make them especially suited for adsorption. They also have an exceedingly large surface area and what is also unusual, they possess an electrical charge. This latter phenomenon is shown by a strong tendency toward electrostatic effects.

It is also to be noted that filter units may be made by spreading the granulated filter material, or mixtures of the granulated filter material and aluminum hydroxide and magnesium trisilicate, on a sheet of cigarette paper or other suitable thin cellulosic stock; rolling the same; and cutting therefrom suitably sized plugs or cartridges. These plugs constitute suitable filter units.

Table I, below, sets forth the filtration effects of filter units made in accordance with this invention as compared with those of filter cigarettes on the market. 150 mgs. of a granulated material as prepared in Example 3 hereinabove was used in these comparisons.

TABLE I

| Filter Brand | | Brand filter removed and replaced with 150 mgs. of filter material of Example 3 | |
|---|---|---|---|
| Total Particulate Matter | Nicotine | Total Particulate Matter | Nicotine |
| Mgs. | Mgs. | Mgs. | Mgs. |

| | | | | |
|---|---|---|---|---|
| Pall Mall | 26.9 | 1.51 | 10.9 | .55 |
| Chesterfield | 26.4 | 1.14 | 10.7 | .53 |
| Marlboro | 26.0 | 1.36 | 7.9 | .41 |
| Lucky Strike | 25.7 | 1.09 | 10.3 | .53 |
| Viceroy | 23.4 | 1.34 | 6.7 | .39 |
| Winston | 23.3 | 1.28 | 9.9 | .50 |
| Lark | 21.8 | 1.21 | 9.6 | .34 |
| Kent | 17.2 | .83 | 7.9 | .35 |
| True | 14.4 | .74 | 6.6 | .36 |
| Carlton | 10.6 | .59 | 3.2 | .20 |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for producing a filter material for use in filtering an aerosol, which process comprises reacting a polyisocyanate and a polyol in amounts sufficient to provide a ratio of reactive isocyanate groups to organic hydroxyl groups of between about 0.75 and 1.25 to produce a rigid polyurethane, in the presence of sufficient blowing agent that the rigid polyurethane shall be produced as a foam having a density of less than about 3 pounds per cubic foot, granulating the resulting rigid foam to produce granules essentially devoid of cellular structure and of a jagged, spiny, cragged nature, having a particle size of less than 750 microns, subjecting the granules to a hydrolysis treatment with hot water or steam, and drying the product.

2. A process in accordance with claim 1 wherein the polyisocyanate is tolylene diisocyanate.

3. A process in accordance with claim 1 wherein between about 40 and 150 parts by weight of polyisocyanate are employed for each 100 parts of polyol.

4. A process according to claim 1 wherein the polyurethane is prepared in the presence of a water-soluble salt of an acid of a metal of Groups VA and VIA of the Periodic Table of Elements.

5. A process according to claim 1 wherein the polyurethane is prepared in the presence of a water-soluble alkali salt of an acid of a metal selected from the class consisting of tungsten, vanadium, chromium and molybdenum.

6. A process according to claim 1 wherein the polyurethane is prepared in the presence of a water-soluble alkali tungstate.

7. A process according to claim 4 wherein the amount of said water-soluble alkali salt employed is between about 0.2 and 4 parts by weight per 100 parts of polyol.

8. A process according to claim 1 wherein the polyurethane is prepared in the presence of a lower alkyl silicate.

9. A process according to claim 1 wherein the polyurethane is prepared in the presence of up to about 5 parts by weight of ethyl silicate per 100 parts of polyol.

10. A process according to claim 1 wherein there is added to the dried product a member selected from the class consisting of alkaline earth metal carbonates, silicates and hydroxides.

11. A process according to claim 10, wherein said member is added in an amount not exceeding 25 percent by weight of the dried product.

12. A process according to claim 1 wherein there is added to the dried product between about 3 and 15 percent by weight of an approximately equal parts mixture of aluminum hydroxide and magnesium trisilicate.

* * * * *